Feb. 5, 1963   A. J. BUTLER ETAL   3,076,563
MOBILE RECORD CARRIER
Filed June 27, 1960   6 Sheets-Sheet 4
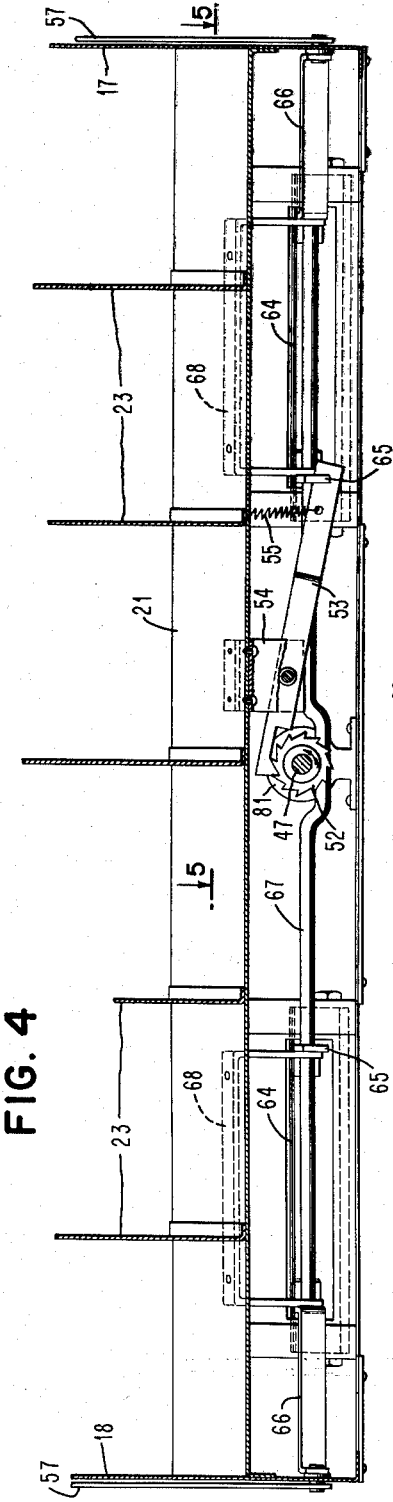
FIG. 4
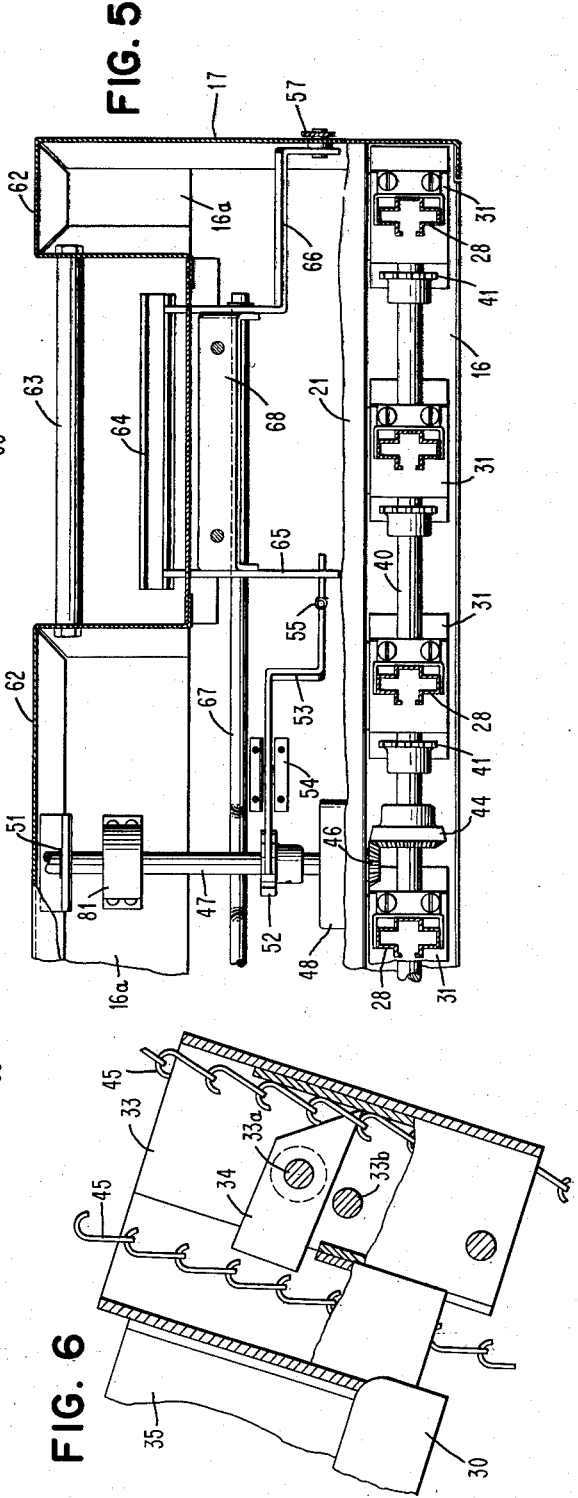
FIG. 5
FIG. 6

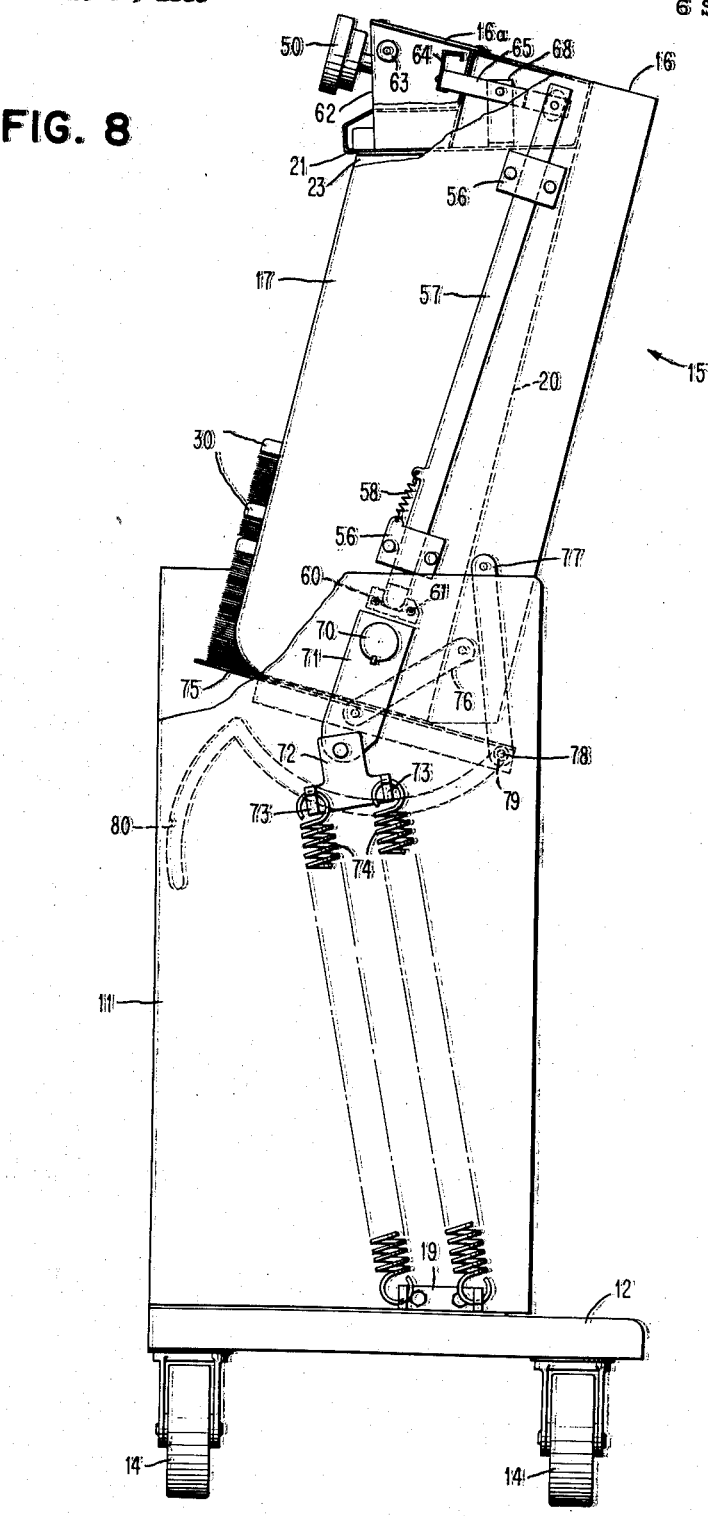

3,076,563
MOBILE RECORD CARRIER
Arnold J. Butler, Wappingers Falls, N.Y., and Norman A. Hedstrom, Worcester, Mass., assignors, by direct and mesne assignments, to International Business Machines Corporation, New York, N.Y., a corporation of New York
Filed June 27, 1960, Ser. No. 38,983
5 Claims. (Cl. 214—1)

This application relates to record storage and more particularly to a storage carrier for a plurality of records of different classes.

In machine sorting records such as cards, checks and the like it is often necessary to run the records through the machine a number of times. In doing this the order of the records is reversed and the stacks must be turned over before being reinserted in the machine. Since the modern sorters run at high speeds such as 2000 records per minute, to remove the records and reinsert them manually requires considerable skill and dexterity.

It is therefore the principle object of this invention to provide a storage carrier that will invert a plurality of stacks of records simultaneously.

Another object of the invention is to provide a mobile carrier that will transport stacks of records quickly from one part of a machine to another.

A further object of the invention is to provide a mobile record carrier that is inexpensive and easy to handle.

The foregoing and other objects, features and advantages of the invention will be apparent from the following more particular description of preferred embodiments of the invention, as illustrated in the accompanying drawings.

In the drawings:

FIG. 4 is a cross sectional view taken along line 4—4 of FIG. 2 showing the latch mechanism for the stacker plate operating mechanism, looking from the rear of the machine.

FIG. 5 is a cross sectional plan view taken along line 5—5 of FIG. 4 showing the latch mechanism;

FIG. 6 is an enlarged detail showing of the pawl and chain drive for the stacker plate operating mechanism;

FIG. 8 is similar to FIG. 7 showing the cabinet in fully rocked or unloading position;

In operating the present day sorting machines such as that disclosed in the patent to Lake et al. 2,658,682 the speed of one thousand to fifteen hundred cards per minute is often reached. With cards falling into the pockets of such a machine at an average of one to two hundred cards per minute the operator must move quickly to empty the pockets before a full pocket detector will shut down the machine. Also it is often necessary to run a stack of cards through the sorter a number of times. If the cards are not turned over the former sequence is broken and the numbers are in reverse sequence. With the invention, cards may be stored during a run of the machine thus permitting half the deck to be sorted while the other half is held in the carrier. The carrier provided with pockets more than equal in length and corresponding in number to those in the sorter is positioned alongside the sorter with the pockets of both in alignment. The cards in the sorter are then manually withdrawn from the sorter pockets and dropped on the stacker plates of the carrier. As cards accumulate in the pocket, the plate is lowered. When one or more are filled the carrier is rolled to the head of the machine. The container is then rotated 180° about its horizontal axis to turn all records over preparatory to reinserting in the sorter.

Figure 1:
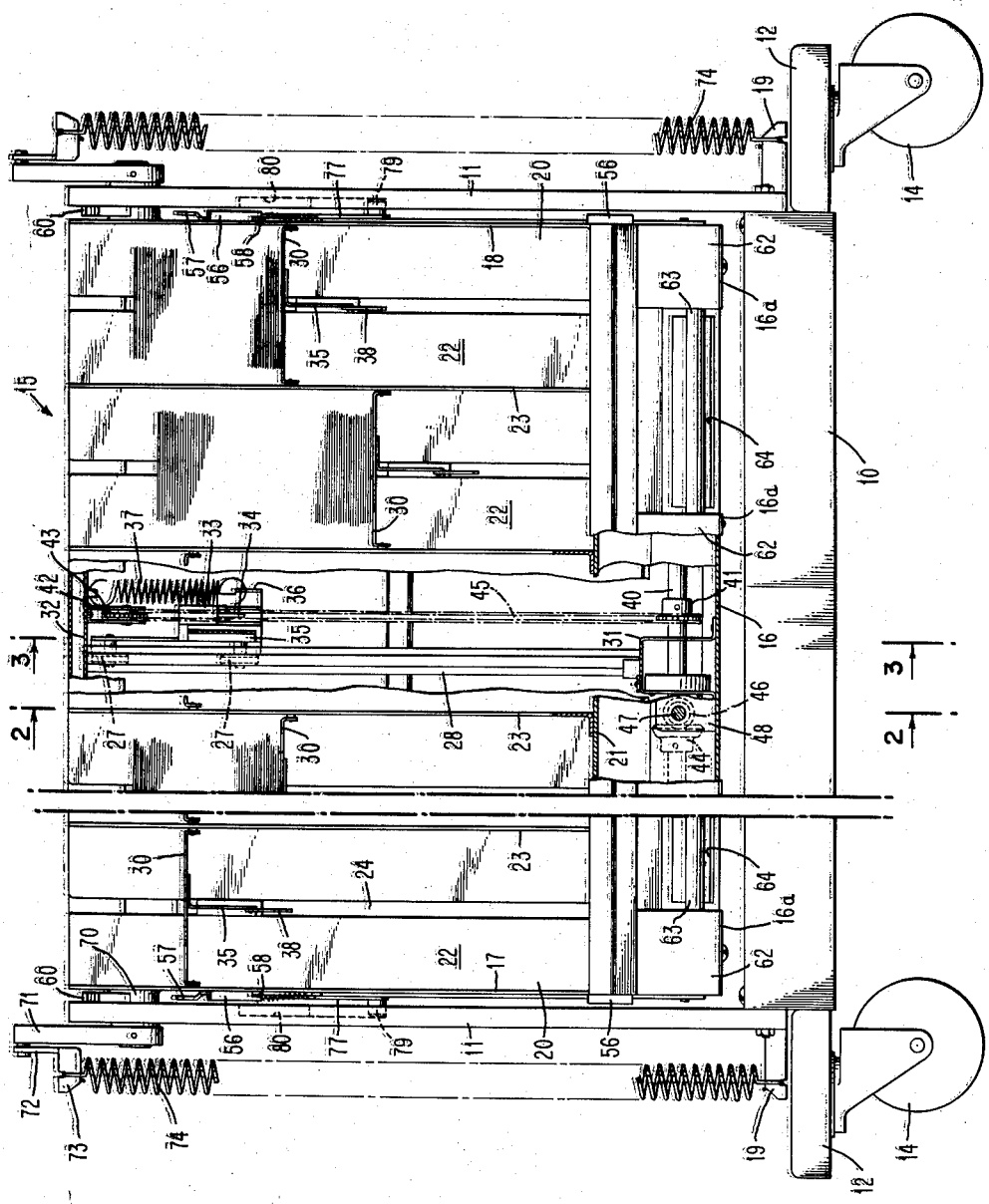
FIG. 1 is a front elevational view of the carrier with parts broken away to show structure and the operating mechanism for the stacker plates.

The carrier or truck comprises a base 10 (FIG. 1) to each end of which is secured by welding or other well known means, an upright frame member 11. Secured to the base near each end is a cross member 12 carrying casters 14. This forms a mobile U-shaped frame in which a cabinet or pocket member 15 comprising a plurality of pockets can be hung for rotation. The number of pockets provided is equal to the number of pockets in the machine being serviced. Only a sufficient number have been shown in FIG. 1 to clearly define the invention.

The cabinet 15 is formed of any light material such as sheet metal having a base 16, side members 17 and 18 and a rear wall 20 secured together by any well known means such as welding. The rear wall is positioned with relation to the side members so as to form a shallow box in which the operating mechanism for the stacker plates is housed. Located slightly above the base 16 and secured to the back and side walls is an inclined platform 21 which forms the bottom of a series of document receiving pockets 22. The pockets are formed of vertical partitions 23 secured to the platform 21 and rear wall 20. The center of the wall 20 in each pocket so formed is slotted at 24 and the edges bent to form lips 25 that act as guides for the carriage of each stacker plate 30.

Figure 9:
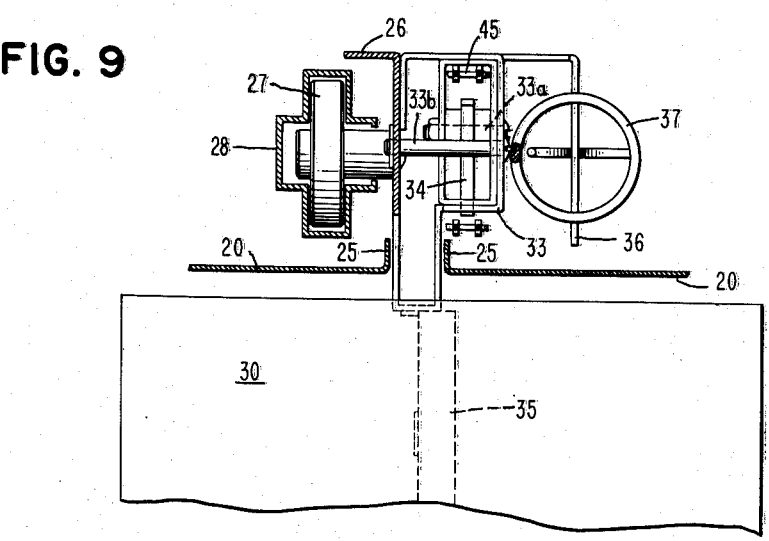
FIG. 9 is a plan view of the mounting for a stacker plate.

The carriage for a stacker plate (FIGS. 1, 3 and 9) comprises a plate 26 in which is journalled a pair of rollers 27. A C-shaped track 28 for rollers 27 is secured at the bottom to a bracket 31 secured to the base 16 and at the top to a cross member 32. The bottom portion of plate 26 is formed, as shown, into a housing 33 for a pawl 34. The pivot 33a of the pawl is located above the center of gravity of the member so that the nose will be rocked into engagement with the links of a chain, as will be described later, when the container 15 is rocked 180 degrees into an unloading position. A cross bar 33b acts as a limit stop for pawl 34 when in normal position. Secured to the front of the housing 33 is a triangular shaped bracket 35 to which the stacker plate 26 is fastened. The reduced portion of housing 33 to which the bracket 35 is secured extends between and is guided by the lips 25. Secured to an ear 36 formed on housing 33 is a spring 37 the free end of which is secured to cross member 32. The stacker plate is supported by the rollers 27 in track 28 and is biased upward by the spring 37. As documents are added to the stacker plate their weight overcomes the spring action and the plate continues to drop until a pendent lug 38 engages the platform 21. This leaves sufficient room after the lug has been rocked back to permit the stacker plate to be raised as will be described later.

Figure 2:
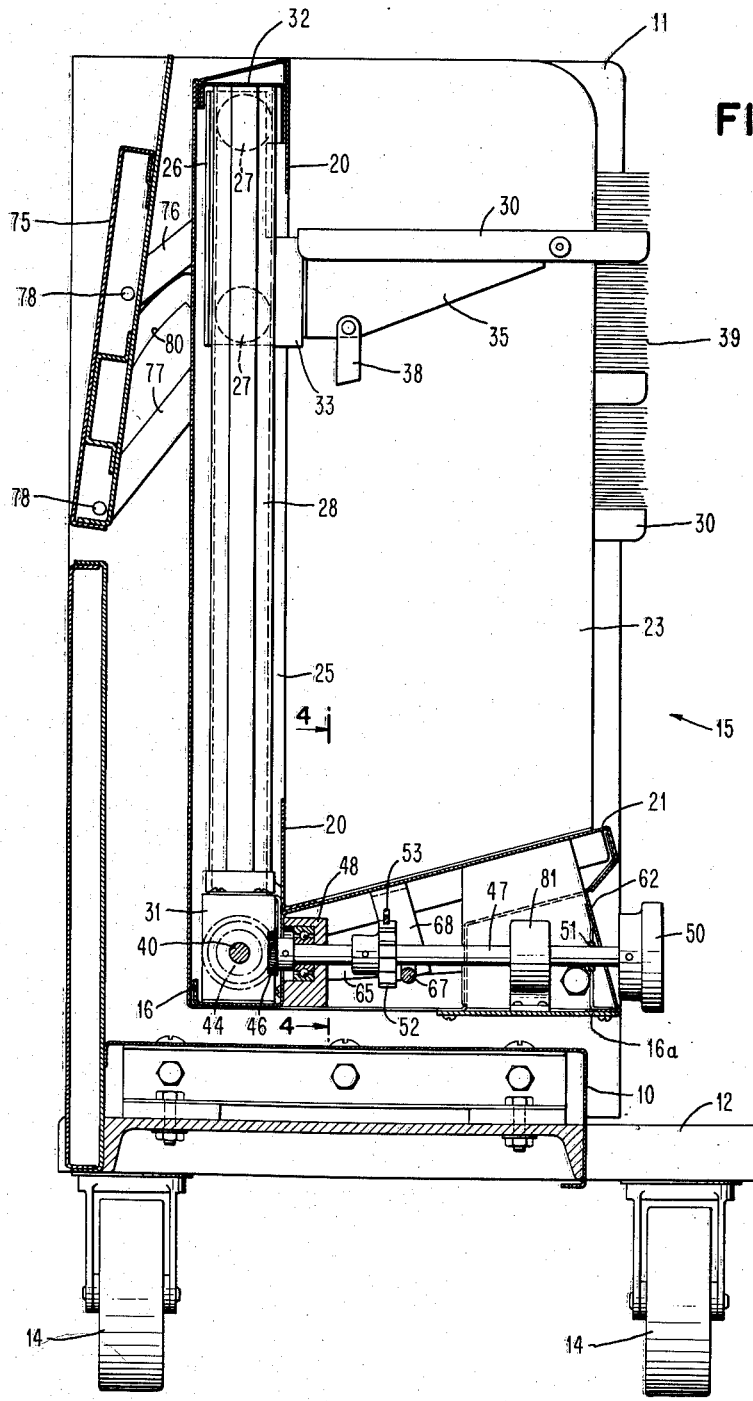
FIG. 2 is a cross sectional view taken along line 2—2 of FIG. 1, showing the latching mechanism for the stacker plates.

Journalled in brackets 31 is a shaft 40 on which is fastened a sprocket 41 for each pocket. Carried in a U-shaped hanger 42 secured to cross member 32 above each pocket is an idler sprocket 43. An endless chain 45 is carried on each pair of sprockets 41 and 43 and runs freely in the housing 33. Secured to shaft 40 (FIGS. 1 and 2) is a bevel gear 44 that engages a second bevel gear 46 secured to one end of a shaft 47 journalled in bearings 48 and 51. A knob 50 is secured to the other end of shaft 47. Also secured on this shaft is a ratchet 52 having a pawl 53 cooperating therewith.

The pawl is pivotally mounted in bracket 54 and is biased by a spring 55 into the teeth of ratchet 52 to prevent clockwise movement of shaft 47 as seen in FIG. 4 which will prevent clockwise rotation of the chain 45. With the cabinet 15 in the loading position (FIG. 3) the chain will not hinder the movement of the stacker plate 26. Clockwise rotation of knob 50 will move the chain in a counterclockwise direction as seen in FIG. 4.

Slidably mounted in brackets 56 (FIG. 7) secured on the face of each of the side walls 17 and 18 is a latch bar 57 that is biased toward the top of the cabinet by a spring 58. These bars engage keepers 60 that are secured to the inner surface of each of the frame members 11 and locks the cabinet in the upright or unloading position. Each keeper is formed with a cam face 61 that cams a latch bar 57 into locking position.

The lower front portion of the cabinet is covered by a plate 62 formed to provide hand holes (FIGS. 4 and 5) in which are positioned handles 63. The handles are secured to the cover 62 that is in turn secured to the base 16. In each of the hand holes is positioned a bar 64 that forms a bail, one arm 65 of which is adapted to rock ratchet pawl 53 and other arm 66 is secured to the end of latch bar 57. The bail is secured to a rod 67 pivotally carried brackets 68 secured to the underside of platform 21. When it is desired to return the cabinet from the unloading to the loading position, the handles 63 are grasped with the fingers and the thumb is used to rock the bar 64 counterclockwise, thereby withdrawing the latch bar 57 from the keeper 60 thus permitting the cabinet to be moved. The rocking bar 64 will unlatch bars 57 and also rock pawl 53 to release ratchet 52.

Secured to the side walls 17 and 18 of the cabinet is a trunnion 70 (FIGS. 1 and 7) that is journalled in a bearing (not shown) in each of the frame members 11. Secured to the outer end of each trunnion is an arm 71 on which is pivotally mounted an inverted T-shaped member 72. Each of the arms of the members 72 are formed with lugs 73 that provide connectors for the ends of balance springs 74, the other ends of which are secured to the cross members 12. These springs are of sufficient strength to counterbalance the cabinet when all of the pockets are filled.

Figure 3:
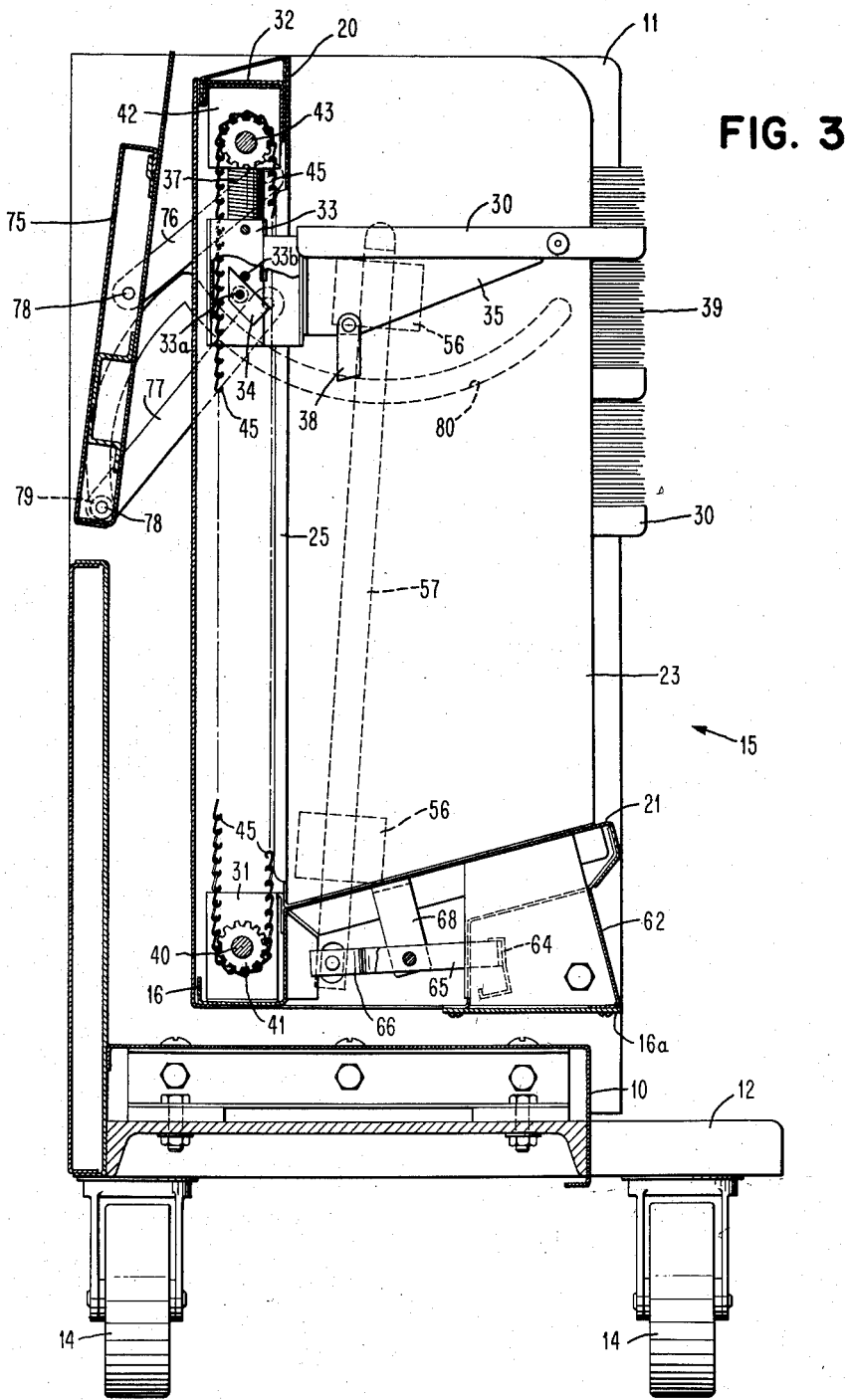
FIG. 3 is a cross sectional view taken along line 3—3 of FIG. 1 showing the latching mechanism for the stacker plates.
Figure 7:
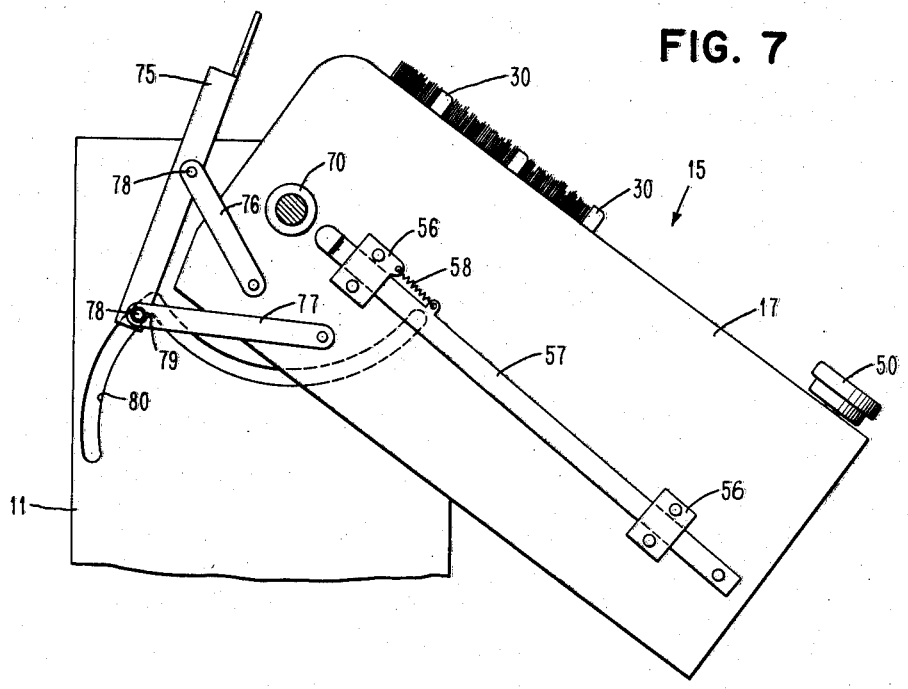
FIG. 7 is a side elevation of the carrier with the cabinet in partially raised position.

A cover 75 is provided for the cabinet 15 to prevent spilling the documents when in the unloading position. It is formed of sheet metal as shown in FIGS. 3, 7 and 8 and attached to the cabinet by arms 76 and 77. The pivot 78 of arm 77 is provided with a roller 79 adapted to follow a cam slot 80 cut in the inner surface of each of the side frames 11. As the container is rocked through 180 degrees the cover is caused to move from the position of FIG. 3 through that of FIG. 7 to that of FIG. 8 over the top of the pockets and remain there as the container settles.

In operation the carrier is positioned alongside a sorter with the pockets of both in alignment. The carrier by preference is of such a height that a full pocket of the sorter is approximtaely on a level with a stacker plate in uppermost position thus in transferring documents from the sorter to the carrier they are slid forward and allowed to drop on the stacker plates 26. When all the documents are transferred the cabinet is rotated and the cover 75 now forms the bottom of the pockets. The springs 37 will maintatin the stacker plates 26 against the stacks of documents. During the 180 degree rotation the nose of pawl 34 will be rocked by gravity into the path of the links of the rear run of chain 45 (see FIG. 6). If the knob 50 is now rotated clockwise shaft 47 (FIG. 1) will be rotated clockwise and through bevel gears 44 and 46 will rotate shaft 40 away from the reader and counterclockwise in FIG. 3. This will cause the left or rear hand run of chain 45 to move downward. In FIG. 6 the chain and pawl are shown rotated 180 degrees with the cabinet in the unloading position. Here the rear (now right hand) run of chain 45 will be moving up thus engaging the pawl 34 and connecting the stacker plate 26 for movement away from the pile of documents to permit their removal from the pocket. The ratchet and pawl 52—53 holds the stacker plate raised against the action of springs 37. After the documents are removed stacker plates may be released by rocking one of the bars 64 rocking pawl 53 out of ratchet 52 permitting rotation of shaft 47. A governor 81 of any well known type connected to shaft 47 controls the shaft rotation and prevents slamming of the stacker plates on returning to normal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A storage rack for use with document sorting machines, comprising a base, a cabinet mounted on said base for rotation about a horizontal axis from a loading to an unloading position, said cabinet being divided by vertical walls into compartments, a spring balanced stacker plate in each compartment, a cover for the top of said cabinet moved by rotation of said cabinet into position wherein documents are retained between said cover and plate during rotation of said cabinet, and means for retracting said plate to permit removal of said documents when in the unloading position.

2. A storage rack for use with document sorting machines, comprising a base, a cabinet having a plurality of compartments equal in number and capacity to the pockets of said machine, means on said base for mounting said cabinet for rotation of said compartments from a loading to an unloading position, said compartments each containing a spring balanced stacker plate for supporting a stack of documents, means actuated by rotation of said cabinet and coacting with said stacker plate whereby said stacks of documents are retained in said compartments without disturbing their arrangement during rotation of said cabinet, drive means engageable with said stacker plates when in unloading position and means for actuating said drive means whereby said stacker plates are withdrawn from retaining position to permit withdrawal of said documents from said compartments.

3. A storage rack for use with document sorting machines, comprising a base, a cabinet having a plurality of compartments equal in number and capacity to the pockets of said machines, means on said base for mounting said cabinet for end for end rotation of said compartments from a loading to an unloading position, said compartments each being open at front and top and containing a spring balanced stacker plate, a cover forming a top for said compartments, means for moving said cover into covering position during end for end rotation whereby the stacks of document are retained in said compartments without disturbing their arrangement, a drive engageable with said stacker plates when in unloading position and means for actuating said drive whereby said stacker plates are elevated to permit withdrawal of said documents from said compartments.

4. A storage rack for use with document sorting machines comprising a base, a cabinet mounted on said base for rotation about a horizontal axis from a loading to an unloading position, said cabinet being divided into compartments complementary to and for receiving documents from said sorting machine, a spring balanced stacker plate in each compartment, a latch means for retaining said cabinet in unloading position, a chain drive for moving and retaining said stacker plates against the action of the respective springs and means for simultaneously releasing said latch and stacker plates to permit the return of said cabinet to the loading position and the stacker plates, to free spring operation.

5. A storage rack for use with document sorting machines, comprising a base, a cabinet having a plurality of compartments equal in number and capacity to the pockets of said machine, means on said base for mounting said cabinet for rotation of said compartments about a horizontal axis from a loading to an unloading position, said compartments each being open at front and top and containing a spring balanced stacker plate, a cover forming a top for said compartments, cam means for moving said cover into covering position during rotation to the unloading position whereby the stacks of documents are retained in said compartments without disturbing their arrangement, a chain drive for said stacker plates, a gravity operated pawl connecting said drive and stacker plate when in unloading position and means for actuating said drive whereby said stacker plates are elevated to permit withdrawal of said documents from said compartments.

References Cited in the file of this patent

UNITED STATES PATENTS

| | | |
|---|---|---|
| 2,520,252 | Mutchler | Aug. 29, 1950 |
| 2,668,626 | Stuivenberg | Feb. 9, 1954 |
| 2,980,272 | Wedensky | Apr. 18, 1961 |

FOREIGN PATENTS

| | | |
|---|---|---|
| 343,007 | Germany | Feb. 8, 1921 |